(12) United States Patent
Perlman

(10) Patent No.: US 8,512,794 B2
(45) Date of Patent: Aug. 20, 2013

(54) OLEATE ESTER PHYTOSTEROL COMPOSITIONS

(75) Inventor: Daniel Perlman, Arlington, MA (US)

(73) Assignee: Perlman Consulting, LLC, Arlington, MA (US)

( * ) Notice: Subject to any disclaimer, the term of this patent is extended or adjusted under 35 U.S.C. 154(b) by 258 days.

(21) Appl. No.: 13/107,364

(22) Filed: May 13, 2011

(65) Prior Publication Data

US 2011/0287156 A1    Nov. 24, 2011

Related U.S. Application Data

(60) Provisional application No. 61/346,896, filed on May 20, 2010.

(51) Int. Cl.
*A23D 9/007*      (2006.01)

(52) U.S. Cl.
USPC .......................................... 426/611; 426/601

(58) Field of Classification Search
USPC ....................................................... 426/611
See application file for complete search history.

(56) References Cited

U.S. PATENT DOCUMENTS

| | | | | |
|---|---|---|---|---|
| 5,502,045 | A | * | 3/1996 | Miettinen et al. ............. 514/182 |
| 6,025,348 | A | * | 2/2000 | Goto et al. .................... 514/182 |
| 6,031,118 | A | * | 2/2000 | van Amerongen et al. ... 552/544 |
| 6,106,886 | A | * | 8/2000 | van Amerongen et al. ... 426/611 |
| 7,718,817 | B2 | * | 5/2010 | Watanabe et al. ............. 554/205 |
| 2004/0105931 | A1 | * | 6/2004 | Basheer et al. ............... 426/601 |
| 2005/0054621 | A1 | * | 3/2005 | Gako-Golan et al. ........ 514/171 |
| 2006/0280764 | A1 | * | 12/2006 | Watanabe et al. ............. 424/401 |

* cited by examiner

*Primary Examiner* — Carolyn Paden
(74) *Attorney, Agent, or Firm* — McLane, Graf, Raulerson & Middleton, PA

(57) ABSTRACT

An edible composition for ingestion by mammals, especially by humans, that includes a fat-based blend containing: (a) at least one triglyceride-based fat, (b) a low level of diglycerides, for example, less than 3% by weight of diglycerides, e.g., diacylglycerol (DAG), and (c) at least 2% and in some instances at least 5% by weight of a mixture of fatty acid Ester Phytosterols (EPs), in which at least 65% by weight of the fatty acid EPs are Monounsaturated (oleate)-Ester Phytosterols (MEPs), and less than 20% by weight of the fatty acid EPs are Polyunsaturated (linoleate+alpha-linolenate)-Ester Phytosterols (PEPs). The increased proportion of MEPs and decreased proportions PEPs and diglycerides substantially increase the oxidative stability index (OSI), shelf life, and health benefits of the above mixture of fatty acid EPs, while providing an advantageous melting temperature and desirable mouth feel for this mixture of fatty acid EPs.

5 Claims, No Drawings

OLEATE ESTER PHYTOSTEROL COMPOSITIONS

RELATED APPLICATIONS

This application claims the benefit, under 35 U.S.C. §119, of the filing date of U.S. Provisional Application No. 61/346,896, filed May 20, 2010 and entitled Oleate Ester Phytosterol Compositions. The entire teachings of the referenced provisional are hereby incorporated by reference.

FIELD OF THE INVENTION

The present invention relates to the use of monounsaturated oleate ester phytosterols to replace a substantial proportion of common polyunsaturated fatty acid ester phytosterols in a substantially diglyceride-free fat or oil blend, to produce enhanced foods and dietary supplements with unexpectedly good mouth feel and improved shelf life owing to the unexpectedly low melting temperature and high oxidative stability of oleate ester phytosterols.

BACKGROUND OF THE INVENTION

The following discussion is provided solely to assist the understanding of the reader, and does not constitute an admission that any of the information discussed or references cited constitute prior art to the present invention.

It is generally understood, that to obtain an appreciable cholesterol-lowering benefit from phytosterols, e.g., plant sterols, stanols, or combinations thereof, including beta-sitosterol, beta-sitostanol, campesterol, campestanol, stigmasterol, stigmastanol, brassicasterol, brassicastanol, clionasterol and clionastanol (collectively termed phytosterol or phytosterols), the phytosterols should be esterified to fatty acids to promote their solubility in fats, be accompanied by emulsifiers, or dissolved in an edible oil or other solvent so that the phytosterols can combine with cholesterol in the small intestine to inhibit its absorption into the bloodstream.

This belief has been supported by early research carried out in the 1950s through the 1970s showing that large doses of phytosterols in their solid form, e.g., coarse powders, were required to achieve meaningful decreases in plasma cholesterol levels. For example, in 1956, Faquhar et al., (Circulation, 14, 77-82, 1956) showed that doses of 12-18 g per day of beta sitosterol (provided in divided doses) were required to achieve a 15-20% lowering of serum cholesterol in males with atherosclerosis. In another study, 9 g per day (3 g t.i.d.) of soybean-derived phytosterols were required to lower plasma cholesterol approximately 9% (Kucchodkar et al., Atherosclerosis, 23, 239-248, 1976). In yet another study, 3-9 g per day of tall oil-derived phytosterols were required to lower plasma cholesterol approximately 12% (Lees et al., Atherosclerosis, 28: 325-333, 1977). In a recent study, 1.7 g per day of finely powdered tall oil-derived phytosterols were sufficient to lower total plasma cholesterol by 9% and LDL-cholesterol by about 15% (Jones et al., Am J Clin Nutr, 69: 1144-1150, 1999).

It has been generally appreciated that phytosterols such as alpha- and beta-sitosterol, stigmosterol, campesterol, and the corresponding saturated (chemically reduced or hydrogenated) "stanol" species, are insoluble in water, and only slightly soluble in edible oils. Accordingly, to promote the solubilization of phytosterols, and their efficacy in lowering plasma cholesterol, U.S. Pat. No. 6,025,348 by Goto et al. describes the incorporation of at least 15% and as much as 70% by weight or more of a polyhydric alcohol/fatty acid ester (including glycerol fatty acid esters containing at least two esterified and at least one unesterified hydroxyl group such as diacylglycerols or diglycerides), into a fat. Between 1.2% and 4.7% by weight of phytosterol is incorporated into the polyhydric alcohol/fatty acid ester containing fat composition.

U.S. Pat. No. 6,139,897 by Goto et al. describes an oil or fat composition containing 80% or more diacylglycerol and up to 20% phytosterol. The high proportion of diacylglycerol assures solubility or dispersal of the phytosterol to provide a cholesterol-lowering fat substitute.

U.S. Pat. No. 5,998,396 by Nakano et al., describes an edible oil containing a phytosterol, vitamin E, and an emulsifier rendering the phytosterol soluble in both the vitamin E and the edible oil.

U.S. Pat. No. 5,419,925 by Seiden et al. describes a reduced calorie fat composition based upon a substantially non-digestible polyol fatty acid polyester plus reduced calorie medium chain triglycerides and other reduced calorie fats or noncaloric fat replacements including plant sterol esters that are soluble in such fat compositions. Free fatty acids, vitamin E and tocotrienol have each been utilized by other inventors to promote the solubilization of phytosterols in fats and oils, with the expectation that the cholesterol lowering properties of various phytosterols would be improved.

U.S. Pat. No. 5,244,887 by Straub describes the preparation of a cholesterol-lowering food additive composition with plant stanols, including: (i) an edible carrier such as an oil, monoglyceride, diglyceride, triglyceride, tocopherol, alcohol or polyol, (ii) an antioxidant and (iii) a dispersant or detergent-like material such as lecithin, or other phospholipids, sodium lauryl sulfate, a fatty acid, salts of fatty acids, or a fatty acid ester. Straub cites research showing that 1.5 grams per day of a stanol mixture derived from soybean sterols lowered blood cholesterol by 15% after 4 weeks of therapy, and believes that these stanols are preferred to sterols based upon less stanol absorption from the G.I. tract and better heat stability in air than sterols.

U.S. Pat. No. 5,932,562 by Ostlund, Jr. describes an aqueous micellar mixture of plant sterol and lecithin (in a 1:1 to 1:10 mole ratio) which has been dried to a water soluble powder and which is useful as a food additive for reducing cholesterol absorption.

U.S. Pat. No. 4,195,084 by Ong describes a taste-stabilized pharmaceutical suspension of sitosterols to reduce hypercholesterolemia, in which the suspension includes the plant sterol, a chelator such as calcium disodium EDTA, a surfactant and other ingredients to assure suspension and dispersal of the phytosterol.

U.S. Pat. No. 3,881,005 by Thakkar et al. describes a pharmaceutical dispersible powder for oral administration in which sitosterols are combined with any one of a variety of excipients, and any one of a variety of pharmaceutically acceptable surfactants.

U.S. Pat. No. 6,267,963 by Akashe et al. describes a plant sterol/emulsifier complex that has a lower melting temperature than the plant sterol alone. The complex, e.g., a co-crystallized monoglyceride and plant sterol mixture, is said to facilitate incorporation of the sterol into food products without adversely affecting the texture of the food products.

As indicated above, it has been widely believed that increasing the solubility of phytosterols in fat increases their bioavailability and reduces the dose required to achieve a specified degree of cholesterol reduction. Thus, U.S. Pat. No. 5,502,045 by Miettinen et al., describes the preparation and use of the plant stanol, beta sitostanol, in the form of a fatty acid ester which is readily soluble in an edible oil, to reduce the serum cholesterol level in humans. This technology has been utilized in manufacturing the margarine product marketed under the tradename Benecol®.

U.S. Pat. Nos. 6,031,118 and 6,106,886 by van Amerongen et al. describe similar stanol fatty acid esters but provide different and reportedly improved chemical methods for their preparation. Plant sterols (from soybean oil) have been inter-esterified with fatty acids to produce the margarine marketed under the tradename Take Control®. Clinical studies suggest that with mildly hypercholesterolemic individuals, dietary intake of between 1.5 and 3 grams per day of the free phytosterol (provided in a fatty acid esterified form) is required to decrease plasma cholesterol approximately 15%.

U.S. Pat. No. 5,932,562 by Ostlund, Jr. points out that cholesterol is absorbed from an intestinal micellar phase containing bile salts and phospholipids which is in equilibrium with an oil phase inside the intestine. Prior to recent experiments, delivery of phytosterol as a solid powder or aqueous suspension was thought to be ineffective because of the limited extent of solubility in intestinal liquid phases. In fact, at least two earlier human studies showed that as much as 9-18 grams of sitosterol per day were required to decrease the plasma cholesterol level by approximately 15% when the sitosterol was provided in a coarse powdered (rather than soluble) form.

Use of finely milled powdered free phytosterols suspended in a margarine for cholesterol reduction in hypercholesterolemic humans has been described (Jones et al., Am J Clin Nutr 69: 1144-1150, 1999) and for other mammals (Ntanios et al., Atherosclerosis, 138: 101-110, 1998; Ntanios et al., Biochim Biophys Acta, 1390: 237-244, 1998). In these studies, phytosterol efficacy based on cholesterol reduction appears to be equal to that of phytosterol and stanol esters reported by others.

Another method of producing a fine suspension of microparticulate phytosterols in fat and water has been described by Yliruusi et al. in U.S. Pat. No. 6,531,463. The method involves first heating and dissolving beta-sitosterol in a fat or oil, and then precipitating the phytosterol with water to form a homogenous microcrystalline suspension. While this process appears more cost-effective than grinding, emulsification of fat with water results in a fat becoming susceptible to oxidation and necessitates refrigeration.

The production of microparticulate phytosterols may result in increased cost and decreased quality, e.g., the use of grinding, and can result in a mixed emulsified product that is more susceptible to oxidation and rancidity, particularly when an aqueous fat-phytosterol emulsion is involved. In fact, there are limitations and disadvantages inherent in most of the above prior methods of phytosterol preparation and delivery involving grinding, forming emulsions, mixing with substantial amounts of specialized solubilizing and dispersing agents, and chemical modification of phytosterols, e.g., esterification.

A review article entitled "Therapeutic potential of plant sterols and stanols" (Plat et al., Current Opinion in Lipidology, 11: 571-576, 2000) has summarized the results of a number of independent clinical studies in which human plasma cholesterol levels were monitored before and after ingestion of food products enriched with plant sterols and sterol esters (approximately 2-2.5 g per day). The authors conclude that LDL cholesterol levels decreased significantly, e.g., an average of 10-14%.

SUMMARY OF THE INVENTION

The present invention relates to edible fats and fat-containing prepared foods (e.g., margarine spreads, cheeses, baked foods, fried snack foods and the like) fortified with fatty acid esters of phytosterols, predominantly of the oleate ester variety, in which the phytosterols can beneficially decrease the level of cholesterol in human plasma. When compared to the use of polyunsaturated (18:2 and 18:3) and saturated (16:0 and 18:0) fatty acid esters of phytosterols, the oleate (18:1) esters of phytosterols can improve the rancidity resistance and shelf life of the food without contributing a waxy mouth feel.

Commercially available fatty acid esters of phytosterols are generally produced by esterifying phytosterols purified from vegetable oils or tall oil with the fatty acids from one or more vegetable oils. Polyunsaturated vegetable oils including canola oil, soybean oil and corn oil have been utilized as sources of fatty acids that can be chemically esterified via the single hydroxyl group on the phytosterol molecule to produce sterol esters. The resulting phytosterol fatty acid esters contain high levels of beta-sitosterol and other sterols linked to the individual fatty acids. For typical canola oil, approximately 61% of the fatty acids are oleic acid, 21% linoleic acid, 11% alpha-linolenic acid, and 7% are saturated fatty acids (4% palmitic and 3% stearic). The use of canola oil as a source of fatty acids for producing phytosterol esters has been traditional. This is attributable to an awareness that canola oil is a healthy vegetable oil owing to its omega-3 fatty acid content (alpha-linolenic acid), and to the oil being cost-effective. In addition, it is known that the polyunsaturated fatty acid content of canola oil (approximately 32%), helps establish a beneficially low melting temperature (27-30° C.) for the phytosterol ester material.

The present invention concerns an advantageous approach for incorporating phytosterols in the diet. This approach utilizes esterification of the phytosterols with fatty acids, with the particular fatty acid balance designed to provide excellent palatability and stability against oxidation while avoiding excessive deleterious diglycerides. This is accomplished by incorporating substantial levels of monounsaturated fatty acid esters of phytosterols while limiting the amounts of esters of polyunsaturated fatty acids such as linoleate esters. At the same time, the level of diglycerides is kept very low. The result is an oxidation resistant fat composition with a surprisingly low melting point, which thus provides excellent palatability.

Accordingly, in a first aspect, this invention provides an edible composition, with a fatty portion (usually a fat blend) that contains at least one triglyceride-based fat suitable for ingestion by mammals, and more particularly, by humans. The fatty portion of the composition contains less than 5% by weight (and in certain embodiments less than 4, 3, 2, or 1%) of diglycerides, e.g., diacylglycerol (abbreviated DAG), and also contains at least 2% and in some instances at least 5% by weight of a mixture of fatty acid Ester Phytosterols (EPs), in which at least 65% by weight of the EPs are Monounsaturated (primarily oleate)-Ester Phytosterols (MEPs) and less than 20% by weight of the EPs are Polyunsaturated (primarily linoleate+alpha-linolenate)-Ester Phytosterols (PEPs). In certain embodiments, the increased proportion of MEPs, and decreased proportions of PEPs and diglycerides substantially increase the oxidative stability index (OSI) and/or shelf life and/or health benefits of the above mixture of EPs (as compared to EPs prepared from standard canola oil or EPs combined with substantial amounts of DAG), while having little effect on the melting temperature or compromising the mouth feel of this mixture of EPs. In certain embodiments, the MEPs and PEPs are provided in the form of EP preparations, and in some embodiments a high oleate EP preparation.

In particular embodiments, the fatty portion of the edible composition includes less than 4%, 3%, 2%, 1%, 0.5%, or 0.25% by weight of diglycerides, e.g., diacylglycerol (DAG) and/or at least 65, 70, 75, or 80% by weight of the fatty acid EPs in the fatty portion of the edible composition are Monounsaturated (oleate)-Ester Phytosterols (MEPs). In particular embodiments, which may be separate or in combination with the immediately preceding DAG and/or MEP levels specified, less than 17, 15, 12, 10, or 9% by weight of the fatty acid EPs in the fatty portion of the edible composition are Polyunsaturated (linoleate+alpha-linolenate)-Ester Phytosterols (PEPs).

In beneficial embodiments of the present compositions (e.g., prepared foods) the fatty portion includes EPs (or MEPs) at a level of 2-5%, 5-10%, 10-20%, 20-30%, or 30-40% of the combined EP+fat composition, or the composition contains at least 2%, 5%, 10%, 15%, 20%, 30%, 40% or 50% by weight of EPs (or MEPs) or is in a range defined by taking any two of those values as endpoints of the range. In some cases even higher levels may be used.

In particular embodiments, e.g., embodiments as specified above, the edible composition is the fatty portion, e.g., a cooking oil or a frying or baking shortening.

Likewise in particular embodiments, the edible composition is a prepared food product. Thus, in certain embodiments, the edible composition described above or otherwise described herein for the present invention is or is incorporated into a prepared food product, for example, a margarine, a mayonnaise, a salad dressing, a filled dairy product, a processed cheese, a nut butter, a seed butter, a kernel butter, a peanut butter, a chocolate product, a pastry, a cake, a fried snack food, potato chips, French fries, corn chips, tortilla chips, popcorn, crackers, a nutrition bar, or a dietary supplement, e.g., a weight control product or a geriatric nutrition product.

In certain embodiments of prepared food products, the fat portion of the food product contains a reduced amount of polar and other oxidative by-products compared to a similar fat portion containing EPs prepared from standard canola oil instead of the present fatty portion, e.g., the polar and other oxidative by-products may be reduced by 10, 20, 30, 40, or 50%, or even more. Likewise, in certain embodiments, the shelf-life of a present prepared food product containing MEPs is increased at least 5%, 10%, 20%, 30%, 50%, 100%, or even more compared to an otherwise equivalent food product prepared using a fatty portion containing EPs prepared from standard canola oil instead of the present fatty portion.

In certain embodiments of the compositions (e.g., prepared foods), the oxidative stability index (OSI) of the MEPs is at least 50%, 60%, 70%, 80%, 90%, 100%, 150%, or 200% greater than the OSI of PEPs, or the OSI of the MEP preparation used in the fatty portion is at least 50%, 60%, 70%, 80%, 90%, 100%, 150%, or 200% greater than the OSI of a PEP preparation prepared using standard canola oil.

In particular embodiments, the fatty acids for producing the MEPs for the prepared food are provided by a high oleic vegetable oil, for example, high oleic sunflower oil, high oleic safflower oil, and/or high oleic soybean oil.

In certain embodiments, the fatty portion (e.g., the cooking oil or frying or baking shortening) includes at least one edible triglyceride-based fat or oil selected from the group consisting of natural vegetable oils or fats, natural animal fats and oils, structurally rearranged or modified vegetable and/or animal fats, and combinations thereof; the fatty portion (e.g., the cooking oil or frying or baking shortening) includes at least one oleate fatty acid ester phytosterol compound synthesized from a source of phytosterol compounds selected from the group consisting of vegetable oil-derived phytosterols. The phytosterols used in producing MEPs can, for example, be tall oil-derived phytosterols (such as those obtained from the manufacture of wood pulp from pine trees) and/or vegetable oil-derived phytosterols (such as those derived from soybean oil), and combinations thereof; the fatty portion (e.g., the cooking oil or frying or baking shortening) includes at least one esterified phytosterol selected from the group consisting of oleate esters of beta-sitosterol, beta-sitostanol, campesterol, campestanol, stigmasterol, stigmastanol, brassicasterol, brassicastanol, clionasterol and clionastanol, and combinations thereof.

The present prepared food product may be fried, baked, or otherwise heat-processed with the oil or fat composition, and/or where the oil or fat composition and fatty acid oleate ester phytosterols are added as ingredients in the preparation of the prepared food. Such heating can allow a portion of the esterified phytosterols to be better solubilized and thereby enter and be incorporated into the food product.

Also provided by the invention in a related aspect is a dietary supplement that includes at least one triglyceride-based edible fat, and between 2% and 50% by weight (e.g., from 2-20%, 5-20%, 10-30%, or 20-50%) of MEP ester phytosterols. Such a dietary supplement can also be regarded as a nutraceutical. The supplement can be in numerous different forms, e.g., capsule, pill, or wafer. The MEP-containing composition can be combined with other dietary components, such as protein, vitamins, minerals, and combinations of such components. Advantageously the dietary supplement is a fatty portion as described for the preceding aspect.

The esterified phytosterol content, fat content, preparation method for the composition, and other parameters are as described herein for other aspects involving a fat and esterified phytosterol composition.

In a related aspect, the invention features a method of substantially increasing the oxidative stability index (OSI), shelf life and health benefits of a mixture of fatty acid Ester Phytosterols (EPs) combined with at least one triglyceride-based fat in the fatty portion of an edible composition, as compared to a mixture of fatty acid EPs prepared from standard canola oil. This is accomplished without significantly increasing the melting temperature or compromising the mouth feel of the mixture of fatty acid EPs by increasing the proportion of Monounsaturated (primarily oleate)-Ester Phytosterols (MEPs) while decreasing the proportion of Polyunsaturated (usually primarily linoleate and/or alpha-linolenate)-Ester Phytosterols (PEPs) in the mixture of fatty acid EPs. As indicated above, in certain embodiments, the fatty acid EPs constitute at least 5% by weight of the fatty portion of the edible composition.

In other particular embodiments of the above method, at least 70, 75, or 80% by weight of the fatty acid EPs in the fatty portion of the edible composition are Monounsaturated-Ester Phytosterols (MEPs) and/or less than 17, 15, 12, 10, or 9% by weight of the fatty acid EPs in the fatty portion of the edible composition are Polyunsaturated-Ester Phytosterols (PEPs).

Under some conditions, for the above-described aspects, the MEPs are dissolved with warming in the above referenced edible oil or fat (or a prepared food product containing the oil or fat composition) and subsequently cooling the composition to room temperature. Since the melting temperature for MEPs is typically at or below 30° C., the extent and need for warming is generally limited.

Similarly, a related aspect of the invention provides a method of increasing the oxidative stability of a heated frying fat composition, which involves using a frying fat composition which is an edible composition as described for an aspect above, and where the method further involves maintaining the fat composition at a temperature of at least 100 degrees C., where the fat composition is used for frying. In some embodiments, the fat composition contains at least 10% by weight oleate ester phytosterols.

In certain cases, the frying fat composition is held at the elevated temperature (e.g., at least 100, 120, 140, 150, 160, 170, or 180 degrees C., or in a range of 100-140, 120-160, 150-180, 160-200, or 180-220 degrees C.) for a suitable length of time considering the purpose, e.g., at least 0.1, 0.2, 0.5, 1, 2, 4, 6, 8, or 10 hrs, or even longer. Of course, as with any frying fat composition, eventually the fat will degrade sufficiently that it will not be used any longer for frying, and may be replaced with fresh fat composition.

In particular embodiments, the fat composition oxidizes at a rate that is only 90, 80, 70, 60, 50, 40, 30, 20% or even less of the rate for the same fat composition without esterified phytosterols or other non-fat oxidation rate-reducing components.

In another aspect, the invention features a method for reducing plasma cholesterol levels in mammals, especially in humans, where the method involves providing an edible composition as described above for ingestion by the mammal(s). The MEPs, when ingested, are effective in reducing plasma cholesterol levels, and in certain embodiments, substantially as effective an edible composition which is the same except for containing PEPs prepared using standard canola oil instead of the present MEP and PEP levels.

In advantageous embodiments, the composition is ingested regularly, e.g., on at least 15, 20, 30, 40, 50, 60, 70, or 80% of days within a period of at least 30, 60, 90, 180, 250, or 350 days.

The proportion of esterified phytosterols used in the edible fat-based composition for a prepared food is between 2% and 80% by weight of the composition, and in certain embodiments between 7% and 50% of the composition (or other percentage as described for edible compositions or food products herein). Thus, with the latter range, a serving of food containing 10 grams of a fat-based composition, provides between 0.7 g and 5 g of esterified phytosterols. This amount is consistent with current recommendations published by the U.S. Food and Drug Administration.

In advantageous embodiments, between 1.3 g and 5.0 g of the esterified phytosterols contained in the prepared food are ingested daily by a human(s).

In particular cases, the fat composition contains at least 10%, 15%, 20%, 25%, 35%, 40%, or 50% by weight of esterified phytosterols.

A further aspect of the invention concerns a method for preparing an esterified phytosterol-fortified prepared food. The method involves combining an edible composition as described above (or otherwise described herein for the present invention), e.g., a cooking oil or shortening, and one or more other ingredients for the prepared food. Usually the ingredients are mixed. Often the combined ingredients are heated and often pasteurized or sterilized. If heated, the prepared food is typically cooled to room temperature.

While in most cases the esterified phytosterols are dissolved in oil or fat prior to combining with other food ingredients, for some prepared foods, the esterified phytosterols are combined with the oil or fat during preparation of the prepared food. Thus, alternatively, the fat or oil and the esterified phytosterols can be added as separate ingredients in such manner that the phytosterols will dissolve in the fat or oil upon mixing or heating of the combined ingredients. In cases where the fat-based composition, or the oil or fat and the esterified phytosterols are added as ingredients in preparing the prepared food, commonly a number of different ingredients are blended or mixed such that the various ingredients are relatively uniformly distributed throughout the mixture.

Likewise, another aspect of the invention concerns a method of preparing an edible composition, where the method involves combining at least one triglyceride-based fat with an MEP preparation such that the resulting fatty portion of the edible composition contains at least 2% and in some instances at least 5% by weight of a mixture of fatty acid Ester Phytosterols (EPs), in which at least 65% by weight of the EPs are Monounsaturated (primarily oleate)-Ester Phytosterols (MEPs) and less than 20% by weight of the EPs are Polyunsaturated (primarily linoleate+alpha-linolenate)-Ester Phytosterols (PEPs), and such that the resulting fatty portion contains less than 5% by weight (and in related embodiments less than 4, 3, 2, or 1%) of diglycerides, e.g., diacylglycerol (abbreviated DAG).

In certain embodiments, the increased proportion of MEPs, and decreased proportions of PEPs and diglycerides substantially increase the health benefit and oxidative stability (e.g., as measured by the oxidative stability index (OSI)) of the mixture of EPs (as compared to EPs prepared from standard canola oil or EPs containing substantial levels of diglycerides), while having little effect on the melting temperature or compromising the mouth feel of this mixture of EPs. In most cases, the MEPs and PEPs in the composition are provided in the form of EP preparations, in some embodiments, a high oleate EP preparation.

In particular embodiments, the edible composition is as described for embodiments of the first aspect above.

Additional embodiments will be apparent from the Detailed Description and from the claims.

DETAILED DESCRIPTION OF CERTAIN EMBODIMENTS

Introduction

The present invention relates to improvements in physical, chemical and organoleptic properties of the fatty portion of foods achieved by using certain fatty acid ester plant sterols, e.g., esterified phytosterols or "EPs," in which at least 2% and in related embodiments at least 5% by weight of these EPs are combined with, and dissolved in a triglyceride-based fat or oil-containing composition that contains little or no diglycerides (in some instances than 3% by weight). The above-stated 5% level for EPs is chosen from the following constraint: Under current FDA guidelines, a heart health claim may be established for a food provided that certain nutrient content requirements are met, one of which states that at least 0.65 g of EPs are provided in a serving of food with no more than 13 g of total fat. According to this guideline, the minimum ratio of EP to fat should be 0.65÷13=5%.

Furthermore, according to the invention, most of the Esterified Phytosterols or EPs (including esterified phytostanols) are formed with monounsaturated fatty acids. Thus, the phytosterols are selectively esterified with a rich source(s) of oleic acid (e.g., a Monounsaturated Fatty Acid or "MUFA" thereby forming "MEPs"). On the other hand, Polyunsaturated Fatty Acids (abbreviated "PUFAs") including linoleic acid and alpha-linolenic acid constitute 20% or less (or less than 20%) by weight of the esterified fatty acids. The monounsaturated fatty acids in the esterified preparation (primarily oleic acid (18:1 cis 9)) subsequently constitutes at least 65%. In certain embodiments, they constitute at least 70, 75, or 80% by weight of the esterified fatty acids. (The weight of the phytosterols in the esters is not included in the calculation of these percentages.) These levels are contrasted with those of canola oil previously utilized for making fatty acid-phytosterol esters (approximately 60% oleate and 30% PUFAs). As explained below in greater detail, to obtain the benefits of the present invention, it is important to restrict the amount of diglycerides, e.g., diacylglycerol, that are combined with the MEP and triglyceride constituents described herein.

The MEPs provided can then be used in various ways, e.g., by combining with a triglyceride based fat. In some embodiments, the MEP level in the blend is sufficiently high to provide a nutritionally significant level of phytosterols when the blend is used in normal food preparation.

Together with phytosterols, the fat component of an edible composition as described herein plays a significant role in promoting excretion of cholesterol in the gastrointestinal tract. The MEPs are soluble in an oil or fat composition at room temperature. MEPs, when ingested with a modest amount of dietary fat, e.g., approximately 10 g per meal, are believed be just as effective in lowering plasma cholesterol levels in mammals as PEPs that have been clinically tested and commercialized for a number of years as described in the literature. This dietary fat is provided to initiate gall bladder contraction, thereby promoting bile flow and the accompanying biliary cholesterol transport from the liver to the gastrointestinal tract. Thereafter, the ingested phytosterol esters (MEPs) are expected to form mixed micelles with biliary cholesterol and help promote the excretion of the cholesterol.

Melting Point

Commercially available fatty acid esters of phytosterols are generally produced by esterifying phytosterols purified from vegetable oils or tall oil with the fatty acids from one or more vegetable oils. Polyunsaturated vegetable oils including canola oil, soybean oil and corn oil have been utilized as sources of fatty acids that can be chemically esterified via the single hydroxyl group on the phytosterol molecule to produce sterol esters, although canola oil is by far the most commonly used. The resulting phytosterol fatty acid esters contain high levels of beta-sitosterol and other sterols linked to the individual fatty acids. For typical canola oil, approximately 61% of the fatty acids are oleic acid, 21% linoleic acid, 11% alpha-linolenic acid, and 7% are saturated fatty acids (4% palmitic and 3% stearic).

The use of canola oil as a source of fatty acids for producing phytosterol esters has been traditional. This is attributable to an awareness that canola oil is a healthy vegetable oil owing to its omega-3 fatty acid content (alpha-linolenic acid), and to the oil being cost-effective. In addition, it is known that the polyunsaturated fatty acid content of canola oil (approximately 32%), helps establish a beneficially low melting temperature (27-30° C.) for the phytosterol ester material.

This is important because if the melting point of a fat or sterol ester approaches or exceeds body temperature (37° C.), a disagreeable waxy mouth feel commonly results, thereby compromising the quality of the food. Thus, for canola oil, the high content of alpha-linolenic acid (11%) and linoleic acid (21%) and their low melting points of −11° C. and −5° C. respectively, can offset and depress the higher melting point fatty acid constituents of canola oil, e.g., about 61% oleic acid and 7% palmitic+stearic acids. Unfortunately, the abundance of polyunsaturated fatty acids in canola oil contributes to its oxidative instability and susceptibility to rancidity development. By contrast, palm oil with its reduced proportion of polyunsaturated fatty acids has good oxidative stability. However, it is a poor choice as a source of fatty acids for phytosterol esterification because of the abundance (45% by weight) and elevated melting point (63° C.) of palmitic acid that contribute a waxy mouth feel to the resulting phytosterol esters.

As stated above, PUFAs previously provided by canola oil, constituted a substantial proportion of the total fatty acids esterified into EPs (e.g., at least 30% by weight). The resulting Polyunsaturated Ester Phytosterols (abbreviated "PEPs") exhibited a beneficially low melting point (or more precisely, Mettler Slip Point, aka, melting temperature). By beneficially melting below the temperature of the human mouth (37° C.), an unpleasant waxy mouth feel can be avoided. However, the resulting PEPs, like the PUFAs themselves with a high concentration of carbon-carbon double bonds, are susceptible to premature oxidation and rancidity development during storage.

Applicant has recently made the surprising discovery that PEPs are not unique among the fatty acid EPs for melting at a beneficially low temperature, and having a "non-waxy" mouth feel (see below). When the fatty acid esters were produced by esterifying phytosterol molecules with oil rich in Monounsaturated Fatty Acids, principally oleic acid, (producing MEPs), and tested for melting point, the MEPs very surprisingly had a melting point comparable to that of PEPs. Moreover, as described below, the MEPs exhibited a much lower susceptibility to oxidation and rancidity development than PEPs. Oleic acid for esterification with phytosterols can be conveniently supplied by an oleic acid-rich vegetable oil such as Clear Valley™ high oleic sunflower oil that is commercially available from Cargill, Inc. (Minneapolis, Minn.).

Thus, Applicant has discovered that when MEPs are used alone or combined with edible triglyceride-based vegetable oils, they have a surprisingly low melting point and high oxidative stability. The beneficial and surprisingly low melting point that Applicant has measured for MEPs alone or combined with natural triglyceride-based vegetable oils is surprising, being substantially lower than that expected based upon theory (see below). This property allows MEPs to melt in the mouth, thereby avoiding an undesirable waxy mouth feel. The MEPs also possess a surprisingly high Oxidative Stability Index (OSI, see below). In fact, the melting point of MEPs (alone or combined with triglycerides, in the absence of substantial amounts of higher melting diglycerides and/or monoglycerides) is almost identical to that of the predominant and commercially available canola oil-derived PEPs. This melting point equivalency allows substitution of oleic acid-rich MEPs for canola fatty acid-containing PEPs and/or other polyunsaturated fatty acid ester phytosterols that have been previously manufactured by esterifying the fatty acids from soybean, corn, cotton seed, safflower and other oils) with phytosterols.

Oxidative Stability

As mentioned above, the MEP substitution results in significant improvements in food quality based on a number of criteria in addition to the unexpectedly low melting temperature. For example, dissolving MEPs in edible fats and oils (collectively termed either "fats" or "oils") produces fat blends (and foods containing these fat blends) that have improved oxidative and heat-stability, improved flavor, and longer shelf life. While previous fats that contained PEPs tended to develop undesirable rancid flavor notes over time (the substantial amount of alpha-linolenic acid in canola oil is susceptible to oxidation), MEPs have little to no tendency to develop off flavors. Therefore, substituting MEPs for PEPs in the manufacture of many prepared foods can extend their shelf life, particularly for food products that are heated during manufacture and/or stored at room temperature, With regard to evaluating and comparing the oxidative stability of MEPs and PEPs, the so-called oxidative stability index or OSI (see above) is very useful. Oils and fats have a natural resistance to oxidation depending upon the degree of saturation, natural or added antioxidants, pro-oxidants and prior abuse. Thus, the oxidation process occurs slowly until this resistance is overcome, at which point oxidation accelerates and becomes rapid. The length of time before accelerated oxidation occurs is a measure of the resistance to oxidation and is commonly referred to as the "induction period", or OSI (measured in hours). The OSI is a valuable quality control tool for eliminating problematic ingredients, for identifying food processing steps that may cause stability problems, for measuring the stability of finished products, evaluating antioxidant ingredient efficacy, for monitoring the deterioration of fats, oils, and for many other applications where oxidative rancidity may be the cause of product failure. Because the OSI measurement has predictive value, it is used worldwide by refineries, food companies, pharmaceutical concerns, research institutes, chemical firms, pet food manufacturers, universities and government agencies.

The beneficially high oxidative stability provided by the present compositions is reflected in increased shelf life and/or reduced levels of polar and other oxidative byproducts in foods prepared using these compositions as compared to foods prepared using fat compositions which instead contain EPs prepared from standard canola oil. For example, a present fat-containing processed food product may contain triglycerides that have been partially oxidized by an interval of exposure to heat and air during the manufacture and storage of the prepared food product. Due to the greater oxidative stability of the present compositions, the fat portion of the food product contains a reduced amount of polar and other oxidative by-products compared to a similar fat-based composition containing EPs prepared from standard canola oil instead of the present fatty portion. For example, the polar and other oxidative by-products may be reduced by 10, 20, 30, 40, or 50%, or even more.

As indicated, the greater oxidative stability can also be reflected in increased storage stability of a prepared food product, which may also be referred to as the shelf-life of the product at ambient temperatures. Depending upon the food packaging materials and inert gases utilized in the packaging process, the shelf life for such products will commonly range from approximately one week to a year or more. In certain embodiments, the shelf-life of a present prepared food product containing the high level of MEPs is increased at least 5%, 10%, 20%, 30%, 50%, 100%, or even more compared to an otherwise equivalent food product prepared using a fatty portion which instead contains a standard PEP preparation.

Testing of OSI and Melting Points and Calculation of Expected Melting Points

Applicant obtained assistance with the manufacture and analysis of phytosterol esters from Archer Daniels Midland (ADM Natural Health and Nutrition, Decatur, Ill.). PEPs, MEPs and SEPs respectively using fatty acids from either conventional canola oil, a high oleic sunflower oil (Clear Valley brand high oleic sunflower oil) refined by Cargill, Inc., Minneapolis, Minn.) or a conventional olein fraction of palm oil. Accordingly, the canola oil fatty acids consisted of approximately 61% by weight MUFAs (oleic), 7% of SFAs (5% palmitic, 2% stearic) and 32% PUFAs (including 21% linoleic and 11% alpha-linolenic). The high oleic sunflower oil fatty acids consisted of approximately 84% by weight MUFAs (oleic), 8% of SFAs (4% palmitic, 4% stearic) and 8% PUFAs (linoleic acid). The palm olein fatty acids consisted of approximately 45% by weight MUFAs (oleic), 44% of SFAs (40% palmitic, 4% stearic) and 11% PUFAs (linoleic acid). PEPs, MEPs, and Saturated fatty acid Ester Phytosterols (abbreviated "SEP") were each produced by esterifying the respective oils to the same source of phytosterols (soybean oil phytosterols).

The resulting PEPs, MEPs and SEPs were tested for their resistance to oxidation using conventional OSI analysis under standard conditions at a temperature of 110° C. to determine their oxidative stabilities, e.g., their OSIs, (in hours). All phytosterol esters were also evaluated for their melting points (actually Mettler dropping points, aka, Mettler or melting temperatures), as defined by AOCS Method Cc 18-801, indicating the temperature at which a solid fat becomes sufficiently fluid to flow.

Results were as follows:

|  | PEP | MEP | SEP |
| --- | --- | --- | --- |
| Mettler point (° C.) | 26-29 | 28.2 | 72.8 |
| OSI (hours) | 11 | 29 | 32 |
| Sterol esters (%) | 99% | 99% | 99% |
| Free sterols (%) | 0.8% | 0.4% | 0.7% |

The analysis for free sterols and sterol esters confirmed similarly efficient esterification (approximately 99% conversion) in all three synthetic reactions. The Mettler dropping points indicate the following: SEP would not be very useful in most food applications because it is waxy and fails to become fluid until it is heated to a surprisingly elevated temperature (above 70° C.). On the other hand, the fact that both MEP and PEP share a very similar Mettler temperature was also surprising and unanticipated (see below). To the best of Applicant's knowledge, comparative melting temperatures of SEP, MEP and PEP (e.g., palmitate-rich, oleate-rich and linoleate/alpha-linolenate-rich phytosterol esters) have not been previously published. The 26-30° C. range of melting temperature for both PEP and MEP allows these phytosterol esters to remain solid or semi-solid at room temperature, yet allows both of these esters to conveniently melt in the mouth without any waxiness.

With regard to the OSI values, the SEP and MEP esters (32 and 29 hours) are far superior to the PEP canola ester phytosterols (11 hours) with regard to oxidative stability. In particular, the nearly 3-fold improvement in oxidative stability for MEP over PEP is remarkable, and has important commercial implications. It indicates greatly improved heat-stability, shelf life, and is strongly indicative that the flavor stability (resistance to rancidity development) of fats and processed foods containing MEP will be substantially improved over PEP-containing fats and processed foods.

As indicated above, the fact that the melting temperature measured for MEP (produced with high oleic sunflower oil) was found to be very similar to that of PEP (produced with regular canola oil) was not anticipated. However, this unexpected discovery is very useful because with the melting temperature being below the normal oral temperature, MEP can be incorporated into processed foods without producing a waxy mouth feel as stated above. Conversely, the very elevated melting temperature measured for palmitate-rich phytosterols (SEPs) produced by esterifying palm olein fatty acids with soybean oil-derived phytosterols limits the utility of these SEPs in processed foods because of their waxy mouth feel.

From a theoretical basis, the melting temperature differential, comparing both SEP and MEP to that of PEP, is surprising. For example, given the difference in fatty acid composition between palm olein and regular canola oil, a significant increase in the melting point for the palm olein ester was expected. More specifically, comparing the palm olein used in producing SEP to the canola oil used in preparing PEP, the following differentials in fatty acid content were calculated (SEP fatty acid content minus PEP fatty acids based upon 100% for the total fatty acid content of each): −11% for alpha-linolenic (0 vs. 11); −10% for linoleic (11 vs. 21); −16% for oleic (45 vs. 61), and +36% for palmitic+stearic (43 vs. 7).

The following typical melting points (averaged from the literature) were utilized for the relevant fatty acids: alpha-linolenic, −11° C.; linoleic, −5° C.; oleic, +14° C.; palmitic+stearic, +66° C. (based on averaging 63° C. for palmitic and 70° C. for stearic). Subtracting these various fatty acid melting temperatures from the measured Mettler temperature for the PEP canola ester (28° C.) provides an indicator for upward (+) or downward (−) changes in EP melting temperature attributable to the differences in fatty acid composition. Accordingly, these differences are: alpha-linolenic, −39° C.; linoleic, −33° C.; oleic, −14° C.; and palmitic+stearic, +38° C. Finally, multiplying these temperature differences by the differential in percentages of fatty acids for SEP minus PEP (see above) yields the following expected contributions for increased melting temperature for SEP above PEP: alpha-linolenic, +4.3° C. (−11%×−39° C.); linoleic, +3.3° C. (−10%×−33° C.); oleic, +2.2 (−16%×−14° C.); and palmitic+stearic, +13.7° C. (+36%×38° C.). Adding these contributions yields +23.5° C.

In other words, it was anticipated that the melting temperature or Mettler drop point of palm olein SEPs would be elevated approximately 24° C. above that of canola PEPs (28° C.), or about 52° C. Since the measured melting temperature was 73° C. rather than 52° C., the melting temperature elevation above that of canola PEPs was almost two-fold greater than anticipated. Applicant has concluded that the greater proportion of saturated fatty acids and lesser proportion of polyunsaturates in SEPs compared to PEPs were responsible for the great elevation in melting temperature.

From the above observations and calculations with SEPs, a substantial increase was anticipated in the melting temperature for high oleic sunflower oil-MEPs compared to canola oil-PEPs, owing to the substantial decrease in PUFA content and increase in MUFAs for the sunflower product. More specifically, comparing the sunflower oil used in producing MEPs with the canola oil used in producing PEPs, the following approximate differentials in fatty acid content are calculated for MEP minus PEP (based upon 100% for the total fatty acid contents in each): −11% for alpha-linolenic (0 vs. 11); −13% for linoleic (8 vs. 21); +21% for oleic (82 vs. 61); and +3% for palmitic+stearic (10 vs. 7). The following typical melting points (averaged from the literature) were again utilized for the relevant fatty acids: alpha-linolenic, −11° C.; linoleic, −5° C.; oleic, +14° C.; palmitic+stearic, +66° C. (based on averaging 63° C. for palmitic and 70° C. for stearic).

Subtracting these various fatty acid melting temperatures from the measured Mettler temperature for the PEP canola ester (28° C.) again provides an indicator for upward or downward changes in EP melting temperature attributable to the differences in fatty acid composition. Accordingly, these differences again are: alpha-linolenic, −39° C.; linoleic, −33° C.; oleic, −14° C.; and palmitic+stearic, +38° C. Finally, multiplying these temperature differences by the differential percentages of fatty acids in MEP minus PEP (see above) yields the following expected contributions for increasing the melting temperature for MEP above PEP:alpha-linolenic, +4.3° C. (−11%×−39° C.); linoleic, +4.3° C. (−13%×−33° C.); oleic, −2.9 (+21%×−14° C.); and palmitic+stearic, +1.1° C. (+3%×38° C.). Adding these contributions yields +6.8° C.

In other words, it was anticipated that the melting point or Mettler drop point of high oleic sunflower MEPs would be at least 7° C. higher than that of canola PEPs based on the decreased level of polyunsaturates in MEP versus PEP.

Given the above underestimate of the increase in melting temperature for SEP over PEP, it was considered likely that the melting temperature for MEP would be elevated even more than 7° C. above that of PEP. If even the 7° C. melting temperature elevation had been borne out in practice, MEPs would have had greatly diminished utility in processed foods. That is if, as expected, the melting point of MEP had been elevated to 35° C. or greater, MEP would either melt slowly or not at all in the mouth, and would have contributed to a waxy mouth feel. Unexpectedly however, as evidenced by the measurements herein, the synthetically esterified MEP and PEP products had nearly the same melting point.

Thus, whereas the SEP melting temperature was elevated much more than anticipated (see above), the MEP melting temperature was elevated much less than anticipated, e.g., not measurably elevated. While not wishing to be bound by theory, it appears that replacing PUFAs by MUFAs in phytosterol ester molecules has little effect on molecular melting temperature, whereas replacing PUFAs or MUFAs by SFAs in phytosterol ester molecules has a greater than expected effect on melting temperature.

In addition to functioning as a plasma cholesterol-lowering nutraceutical ingredient in prepared foods, Applicant has previously shown that phytosterols can help protect fats against oxidation during cooking and storage. These two different and compatible functionalities (plasma cholesterol control and oxidative protection of fats) each support the novel introduction of phytosterols into fat-based compositions or fat-containing prepared foods, e.g., into frying and baking shortenings that are absorbed (e.g., into potato chips) or otherwise incorporated into such prepared foods.

Diacylglyerols (DAGs)

Ziv et al., Lipids in Health and Disease, 2009, 8: 42, describes a so-called "PS-HOSO diet." The diet includes "a novel preparation of plant sterols esterified to high oleic sunflower oil fatty acids mixed with dietary 1,3-DAG" that is "comprised [of] 20% plant sterols esterified with high oleic sunflower oil, and 15% canola oil-based diacylglycerol (DAG)." While this reference makes use of high oleic acid sunflower oil fatty acids esterified to phytosterol to produce an esterified phytosterol, in this study they are combined with canola oil diglycerides for experimental feeding to Israeli sand rats (a gerbil species). While this combination with diglycerides was claimed to provide dietary benefits in the Israeli sand rat, it appears that ingestion of substantial amounts of the synthetic DAG product described by Ziv et al. may be harmful to human health (see below). Moreover, their fatty mixture would have an elevated melting temperature compared to that of MEP, and this factor would run counter to the teaching of the present invention. In fact, the physical, chemical, and organoleptic properties of their mixture of phytosterol esters and diglycerides (e.g., oxidative stability, melting point and/or mouth feel) are not reported by Ziv et al. These properties and/or any comparison of such properties with other phytosterol esters and/or dietary glycerides were not relevant to their study.

While Ziv et al. utilizes a fat+diglyceride+sterol ester blend that combines approximately equal amounts of MEP (high oleic sunflower oil esterified sterols) and canola oil-based diglycerides (e.g., canola diacylglycerol or "DAG"), this blend would not be expected to be particularly resistant to oxidation. Nor is there any indication of, or means to predict, the melting temperature of the described mixture of sterol ester and canola-derived diglyceride. In that publication and its Methods ("Animals and diets"), Ziv et al. specify that the so-called "PS-HOSO diet" contains, along with other constituents, a PS-HOSO ingredient that "comprised 20% plant sterols esterified with high oleic sunflower oil, and 15% canola oil-based diacylglycerol (DAG)." However, a significant health problem has emerged related to the use of canola DAG in human foods. As currently produced, DAGs synthesized from canola oil and soybean oil, for example, contain significant levels of glycidol fatty acid ester by-products. These glycidol esters are suspected of being carcinogens in humans (see aocs.org/news/story.cfm?id=1142).

Another problem with the production of DAGs is that a substantially random rearrangement of fatty acids occurs on the glycerol backbone during DAG synthesis. The substantial and potentially problematic decrease in blood insulin levels (39% average decrease) measured by Ziv et al. during the gerbils' consumption of the PS-HOSO diet was likely related to the synthetic rearrangement, e.g., molecular interesterification, of fatty acids supplied in their dietary DAG. While the fasting blood glucose levels did not increase in these particular animals, a human clinical study by Sundram et al., (Nutrition and Metabolism 2007, 4: 3, <nutritionandmetabolism.com/content/4/1/3>) reveals that when interesterified fat is incorporated into the human diet and compared with non-interesterified dietary fat consumption, plasma insulin levels decreased approximately 20% while fasting plasma glucose levels undesirably increased approximately 20%. Therefore, in contrast to the suggestion of Ziv et al., Applicant suggests the individual should minimize dietary consumption of diglycerides rather than increasing and/or combining them with sterol esters in the diet.

DEFINITIONS

As used herein, the term "triglycerides" refers to compounds in which three fatty acids are esterified to a glycerol backbone. Similarly, the term "diglycerides" refers to compounds in which two fatty acids are esterified to a glycerol backbone, e.g., at the 1,3 or 1,2 positions of the glycerol.

As used herein, the term "standard canola oil" refers to a low erucic acid canola oil containing 60% by weight oleic acid, 32% by weight polyunsaturated fatty acids, 8% by weight saturated fatty acids, and less than 1% by weight erucic acid. For melting point and oxidation resistance measurements, the standard canola oil can be approximated by a canola oil containing 58-62% oleic acid, 28-35% polyunsaturated fatty acids, 6 to 9% saturated fatty acids, and less than 5% erucic acid (and in some embodiments less than 3, 2, or 1%), where the weight percents total 100%. An EP preparation prepared using standard canola oil is referred to as "standard PEPs" or "a "standard PEP preparation", and can be approximated by an EP preparation prepared using a canola oil as indicated above for approximating standard canola oil for melting point and oxidation resistance measurements, without further processing to alter the relative abundances of different fatty acid EPs.

For purposes of comparisons of Oil Stability Index (OSI) as specified herein, OSI measurement are made according to AOCS Method Cd 12b-92, although a method which gives substantially the same results may be used as an alternative. Measurements are performed at 110 degrees C. unless a different temperature is generally accepted as more appropriate for a particular oil composition. Similarly, for purposes of comparisons of oxidative stability using the Active Oxygen Method (AOM), measurements are made according to AOCS Method Cd 12-57, although a method which gives substantially the same results may be used as an alternative. Likewise, measurement of melting temperatures (as Mettler drop points) are performed according to AOCS Method Cc 18-801, although a method which provides substantially equivalent results may also be used as an alternative. Unless otherwise specified, OSI measurements are performed at 110 degrees C. It should be recognized that other measurements of melting temperature can also be used to provide useful indicators and can also provide useful comparisons.

The term "prepared" in the context of a "prepared food product" refers to a commercially processed and packaged food product containing multiple combined ingredients, in which the processing includes at least one step in which the assembled food product (or one or more triglyceride-based fat or oil ingredients that are either contacting, or being combined into the food product), are combined together with a suitable quantity of MEP phytosterol fatty acid ester ingredient(s), and, if required, heated to a temperature sufficient to dissolve the phytosterols in the fat or oil, and often substantially higher than this temperature, and for a period of time sufficient to process, cook, fry, pasteurize or otherwise complete the heat-preparation of the food product. Examples of such prepared food products include bakery products such as breads, pastries and cakes, potato chips (containing at least potatoes, frying fat or oil, and phytosterols), French fries, fried snack foods, corn chips, tortilla chips, popcorn, crackers, salad dressings, peanut butter, soybean butter, sesame seed butter and other nut kernel butters, margarines, mayonnaise, processed cheese, soy milk, cows milk, filled dairy products, chocolate and the like.

Unless clearly narrowed in a particular context to refer to triglycerides solid at room temperature, the term "fat" is used broadly and generally, referring to an edible triglyceride that may be either liquid (also specifically termed oil) or solid at room temperature (also specifically termed fat), and that is derived from a single vegetable source (e.g., soybean, cottonseed, corn) or an animal source (beef tallow, pork lard) or a blended combination of sources. Unless specifically limited to edible triglyceride compositions that are solid at room temperature, use of the term "fat" includes oils. Also unless clearly indicated to the contrary, the term "fat" also includes chemically and enzymatically modified triglyceride-based liquid and solid fats and blends thereof (e.g., hydrogenated, partially hydrogenated, chemically or enzymatically interesterified, or assembled, e.g., "structured" triglycerides and combinations thereof.

The phrase "improved resistance to oxidation" for a fat that contains MEP esterified phytosterols refers to a fat exhibiting at least a 10% reduced rate of degradation by oxidation in air, compared to oxidation of the same fat containing standard PEPs rather than MEPs. This differential oxidation rate is particularly evident during heating of the oil, e.g., frying with the oil at a temperature of 160-190° C. Oxidation rate is evidenced by one or more physical measurements such as dielectric constant measurement of polar oxidation products formed in the fat, AOM (accelerated oxidation measurement and/or OSI (oxidative stability index), or qualitatively by organoleptic quality (tasting for rancidity). The extent of oxidative protection provided by MEP phytosterols dissolved in fat heated to 180° C. is a function of the type of fat and the concentration of phytosterols in the fat. Improved resistance to oxidation is particularly evident in a vegetable oil containing PUFAs, e.g., soybean, corn and canola oil. In certain embodiments, the rate of oxidation as shown by either of the AOM or OSI measurements is at least 10% lower, and in other embodiments, the rate is 20%, 30%, 40% or even 50% lower than the rate containing standard PEPs prepared from standard canola oil rather than MEPs.

The term "partially oxidized" refers to a fat-based composition that has been exposed to air either with or without heating, e.g., frying or baking and that has at least begun to accumulate oxidative by-products whose concentrations are measurable either in the oil or in the vapor above the oil by conventional means, e.g., by conductivity, dielectric constant, and free fatty acid content.

Oxidative protection of fats and oils provided by phytosterols has been reported previously by Applicant in spite of the fact that phytosterols are not generally recognized as antioxidants or as scavengers or quenchers of free-radicals or peroxides and hydroperoxides formed during oxidation of PUFA moieties.

The term "edible" in the context of an oil or fat-based composition means that the composition is suitable for use in mammalian, e.g., human, foods, dietary supplements and pharmaceutical preparations.

The terms "phytosterol(s)" and/or "plant sterols" refer to any of a group of sterols derived from plants, as well as to so-called "stanols" derived from plants or produced by chemical reduction, e.g., hydrogenation, of sterols. The plant stanols or phytostanols are edible, suitable for ingestion with foods and beverages, and also beneficial and biologically effective in reducing the levels of total cholesterol and low density lipoprotein (LDL)-cholesterol in the bloodstream. Similarly, phytosterol esters are herein defined as including the hydrogenated forms of these sterol ester molecules known as stanol esters, plant stanol esters or phytostanol esters. The starting material for producing plant stanol esters is typically plant sterol material that is first hydrogenated to give stanols, which is then esterified with a mixture of fatty acids derived from plants. Stanol esters occur naturally in small quantities in fruits, vegetables, nuts, seeds, cereals, legumes, and vegetable oils The term "non-esterified phytosterols" refers to forms of phytosterols that are free of ester chemical side chains. Non-esterified phytosterols are defined herein to include both the non-esterified sterol and stanol forms of phytosterols. Conversely, "esterified phytosterols" are most commonly fatty acid-esterified phytosterols synthesized to promote phytosterol solubility in fat. In certain embodiments of the present invention, phytosterol esters are dissolved in oils or fats.

The composition which includes between 50% and 98% by weight of at least one triglyceride-based edible oil or fat, allows between 2% and 50% by weight of esterified phytosterols to be added to the same composition. A 5% to 25% by weight concentration range is a range in certain embodiments. Accordingly, at the 3% level, a food that contains 10 g of fat per serving will provide at least 0.3 g of phytosterols per serving. In the case of pharmaceutical preparations, the composition may include as little as 50% by weight of at least one triglyceride-based edible oil or fat, to allow between 3% and 50% by weight of non-esterified phytosterols to be added to the same composition.

The process of treating esterified phytosterols by "heating, dissolving and cooling" refers to a process that: (i) heats the esterified phytosterols together with triglyceride-based fat or oil (and optionally other food ingredients constituting a prepared food product) to a temperature of greater than 30° C. until the phytosterols have dissolved, and then (ii) cooling the heated product. Conventional or normal ambient air cooling rates of prepared foods containing heated triglycerides and esterified sterols is generally adequate.

The term "effective" refers to the extent to which plasma cholesterol levels in mammals are reduced by regular, e.g., daily, twice daily, or thrice daily ingestion of at least either the full recommended dose or the appropriate divided dose (the minimum daily dose specified by the U.S. FDA being 0.8 g phytosterols or 1.3 g esterified phytosterols). In a random population of human adults, a 5% to 15% or greater lowering of total cholesterol in the plasma caused by ingestion of phytosterols or their esters is considered effective.

The term "esterified phytosterols" refers to phytosterols (plant sterols and stanols) that have been joined through an ester linkage to fatty acids using a chemical, enzymatic, combination, or other process. The commercial margarines Benecol® and Take Control® discussed above, incorporate such esterified phytosterols. Therefore, "non-esterified phytosterols" refers to phytosterols that have not been esterified to fatty acids as described.

As used herein, the term "dietary supplement" refers to a preparation that is adapted to augment an individual's normal dietary intake of nutrient components. A "nutraceutical" refers to a product demonstrated to have a physiological benefit or provide protection against chronic disease. In the present invention, phytosterols and their esters provide a hypocholesterolemic benefit and are considered a nutraceutical.

For the definition of any other fat and oil-related terms that have not been defined herein, the reader is referred to the reference book, *Bailey's Industrial Oil and Fat Products*, Fourth Edition, Daniel Swern, editor, John Wiley & Sons, N.Y., 1979.

By "comprising" is meant including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

Unless otherwise defined herein, all terms have their ordinary meanings as understood by one of ordinary skill in the field to which the invention pertains. All patents and publications mentioned in the specification are indicative of the levels of skill of those skilled in the art to which the invention pertains. All references cited in this disclosure are incorporated by reference to the same extent as if each reference had been incorporated by reference in its entirety individually.

One skilled in the art would readily appreciate that the present invention is well adapted to obtain the ends and advantages mentioned, as well as those inherent therein. The methods, variances, and compositions described herein as presently representative of certain embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. For example, MEPs that are constituted using other sources of phytosterols and/or fats and oils not listed herein, or MEPs incorporated into various prepared foods not listed herein, or a combination of other phytosterol sources and other prepared foods are all within the scope of the present invention. Thus, such additional embodiments are within the scope of the present invention and the following claims.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by certain embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values or value range endpoints are provided for embodiments, additional embodiments are described by taking any 2 different values as the endpoints of a range or by taking two different range endpoints from specified ranges as the endpoints of an additional range. Such ranges are also within the scope of the described invention. Further, specification of a numerical range including values greater than one includes specific description of each integer value within that range.

Thus, additional embodiments are within the scope of the invention and within the following claims.

What is claimed is:

1. A method of substantially increasing the oxidative stability index (OS I), of a mixture of fatty acid Ester Phytosterols (EPs) combined with at least one triglyceride-based fat in an edible fat-based blend, without significantly altering the melting temperature or compromising the mouth feel of said mixture of fatty acid EPs, as compared to the OSI and melting temperature of a fat-based blend in which the fatty acid EPs are a standard Polyunsaturated fatty acid Ester Phytosterol preparation (standard PEP preparation), comprising:
    (a) increasing the proportion of Monounsaturated (oleate)-Ester Phytosterols (MEPs) while decreasing the proportion of Polyunsaturated (linoleate+alpha-linolenate)-Ester Phytosterols (PEPs) in said mixture of fatty acid EPs, wherein at least about 65% by weight of said fatty acid EPs are MEPs and less than about 20% by weight are PEPs; and
    (b) limiting the amount of diglycerides in said fat-based blend to less than about 3% by weight, and including at least about 5% by weight of said mixture of fatty acid EPs in said fat-based blend.

2. The method of claim 1, wherein said fat-based blend contains less than about 2% by weight of said diglycerides.

3. The method of claim 2, wherein said fat-based blend contains less than about 1% by weight of said diglycerides.

4. The method of claim 1, wherein at least about 75% by weight of said fatty acid EPs are MEPs.

5. The method of claim 1, wherein less than about 15% by weight of said fatty acid EPs are PEPs.

* * * * *